United States Patent Office 3,279,908
Patented Oct. 18, 1966

3,279,908
HERBICIDAL USE OF SUBSTITUTED
BORA-INDANES
Robert F. Crawford, La Mirada, and William David English, Orange, Calif., assignors to United States Borax & Chemical Corporation, Los Angeles, Calif., a corporation of Nevada
No Drawing. Filed Dec. 4, 1962, Ser. No. 242,113
7 Claims. (Cl. 71—2.5)

This application is a continuation-in-part of our co-pending application Serial No. 133,034, filed August 22, 1961, now abandoned.

The present invention relates to compositions and methods of controlling plant growth and has more particular reference to a new family of plant growth regulants and herbicides.

Plant growth regulants and herbicides comprise a wide variety of chemical compounds which affect the normal growth of plant life. Such compounds can affect plant growth in a number of different ways; they can stimulate plant growth by a hormone effect; they can cause the plants to lose their leaves by a defoliating action; or they can decrease the normal life span of the plants by a desiccating or searing action on the foliage and the stem of the plants.

Plant growth regulants and herbicides which are selective and destroy only undesirable plant growth when used in certain concentrations and which act as general herbicides when applied in higher concentrations are of particular interest to the consumer. Herbicidal compositions which destroy dicotyledonous plants without adversely affecting monocotyledonous plants are of importance for use in destroying undesirable plant growth, weeds, etc., in areas sown with grass or useful crops, such as corn and oats and other grains.

It is, therefore, the principal object of the present invention to provide novel herbicidal compositions and methods for their use.

It is a further object of this invention to provide a method for selectively destroying undesirable dicotyledonous plants in areas sown with monocotyledonous plants.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention provides the method of controlling plant growth which comprises applying to said plants a phytotoxic amount of a compound of the formula:

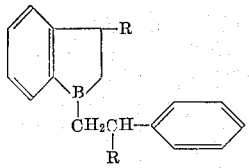

where R is selected from the group consisting of hydrogen and methyl.

The invention also provides herbicidal compositions comprising a surfactant and a compound as defined above.

The herbicides of the foregoing broadly stated paragraph, which are mobile liquids soluble in organic solvents, are illustrated by the following compounds:

1-bora-1-(2-phenylethyl)indane
1-bora-3-methyl-1-(2-phenylpropyl)indane

The preferred method of preparing the above compounds consists of reacting (1) styrene, or (2) α-methylstyrene with diborane. The diborane is slowly bubbled into a solution consisting of an inert reaction medium and one of the foregoing alkenyl substituted phenyl compounds at room temperature. The more volatile components of the resultant reaction mass are removed at ambient temperature, and the residual solution is heated to about 200° C. at reduced pressure. The desired product is then recovered from the residual solution by distillation. The following examples illustrate the method of preparing the compounds.

EXAMPLE I 1-bora-1-(2-phenylethyl)indane

Diborane was generated by the reaction of 0.75 mole of sodium borohydride with 1 mole of boron trifluoride etherate in diethyleneglycol dimethyl ether. The evolved diborane was slowly bubbled into a solution of 2 moles of styrene in 200 ml. of tetrahydrofuran at room temperature over a period of 6 hours. The reaction mixture was maintained under an inert nitrogen atmosphere. After the addition was completed, the mixture was maintained at room temperature under nitrogen for 18 hours. Volatile materials were removed in vacuo and the residue heated to about 200° C. for about 8 hours under reduced pressure to complete the reaction. The residue was distilled under reduced pressure and the product collected, B.P. 158°/4 mm.

EXAMPLE II 1-bora-3-methyl-1-(2-phenylpropyl)indane

Diborane was generated as in Example I by the reaction of 0.39 mole of sodium borohydride with 0.5 mole of boron trifluoride etherate. The diborane was bubbled into a solution of 1.0 mole of α-methylstyrene and the reaction product treated as in Example I. Fractional distillation of the product under reduced pressure gave 1-bora-3-methyl-1-(2-phenylpropyl)indane at 118°–120° C./0.4 mm.

As stated previously, the plant growth regulants and herbicides of the present invention are liquids, and as such they can be applied to the area to be treated in an undiluted state. The amount of active ingredient applied, however, is normally quite small as compared to the area to be treated, and it is generally applied as a spray of the active ingredient dispersed or dissolved in a liquid carrier. Examples of carriers applicable for use with the present compounds are water, organic solvents, mixtures of water and organic solvents, hydrocarbon oils, and emulsions of hydrocarbon oils and water. A hydrocarbon oil is the preferred carrier when an overall herbicidal action is desired and water or organic solvents are the preferred carriers when the compounds are used as selective herbicides. Also, one or more of the well known surfactants preferably are included in the compositions to aid in dispersion and coverage.

The preferred method for applying the plant growth regulants as herbicides is to spray them, as a mixture in one of the above liquid carriers, directly on the vegetation to be treated, since they are most effective when used as post-emergent herbicides. As post-emergent herbicides, these compositions can be used to affect either a selective or a general herbicidal action by controlling their rate of application. At low application rates the herbicidal compositions preferentially lead to the destruction of dicotyledonous plants without adversely affecting monocotyledonous plants while at higher application rates they destroy both classes of plants.

In general, the application rate of active ingredient is in the range of from about 3 pounds to about 60 pounds per acre. When a selective kill of dicotyledonous plants in an area sown with monocotyledonous plants is desired, the application rate is from about 3 pounds to about 20 pounds per acre, and when a complete kill is desired the application rate of active ingredient is from about 20 pounds to about 60 pounds per acre.

EXAMPLE III

To determine the overall herbicidal effect of the compounds, green house flats were planted with eight species of dicotyledonous plants and five species of monocotyledonous plants. The plants were fed a nutrient solution daily and were allowed to grow for periods of from 10 to 15 days. The flats were then sprayed with the specified herbicide dissolved in ethanol at rates of 5 pounds and 30 pounds of active ingredient per acre and control flats were sprayed with equivalent amounts of ethanol. The flats were evaluated twenty days after treatment and the following results were obtained:

TABLE I

| Chemical | Average Percent Kill | |
|---|---|---|
| | 30-lb./acre | 5-lb./acre |
| Control | 0 | 0 |
| 1-boro-1-(2-phenylethyl)indane | 40 | 2.5 |
| 1-boro-3-methyl-1-(2-phenylpropyl)indane | 25 | 5 |

During the first series of evaluations, as shown in Table I, it was noted that the compounds preferentially affected dicotyledonous plants rather than monocotyledonous plants. To verify the selectivity of these compounds and to determine optimum application rates for a complete kill, further green house tests were performed.

EXAMPLE IV

Green house flats were again planted with eight species of dicotyledonous plants and five species of monocotyledonous plants. The plants were fed a nutrient in a water solution daily, and the plants were allowed to grow for fifteen days. The flats were then sprayed at rates of 5 lbs., 10 lbs., 20 lbs., 30 lbs., and 50 lbs. per acre of each specified compound using ethanol as the carrier, and control flats were sprayed with equivalent amounts of the ethanol. The flats were evaluated twenty days after treatment to determine the percent kill of both classes of plants. The results obtained from these tests are shown in Table II below:

TABLE II

| Compound | Application Rate, lbs./acre | Average Percent Kill | |
|---|---|---|---|
| | | Monocots. | Dicots. |
| Control | 0 | 0 | 0 |
| 1-bora-1-(2-phenylethyl)indane | 5 | 0 | 5 |
| | 10 | 0 | 15 |
| | 20 | 5 | 75 |
| | 30 | 20 | 90 |
| | 50 | 50 | 95 |
| 1-bora-3-methyl-1-(2-phenylpropyl)indane | 5 | 0 | 10 |
| | 10 | 0 | 15 |
| | 20 | 0 | 50 |
| | 30 | 90 | 90 |
| | 50 | 95 | 98 |

It can be seen from the foregoing table that at low application rates the present plant growth regulants are selective in their herbicidal activity affecting only dicotyledonous plants without adversely affecting the monocotyledonous plants, while at higher application rates they are effective herbicides for both classes of plants.

It will also be noted here that while the evaluations for herbicidal activity were made twenty days after treatment, in most instances herbicidal action was visible within three hours. Herbicidal activity was noted in thirty minutes and the kill was almost complete within twenty-four hours in many instances where high application rates of the compounds were used.

Furthermore, the data illustrates the superior herbicidal activity of 1-bora-3-methyl-1-(2-phenylpropyl)indane, especially as a non-selective herbicide at the higher application rates. For example, at a rate of 30 pounds per acre, an average kill of 90% was obtained with both monocotyledonous and dicotyledonous plants.

Other modes of applying the principle of the invention may be employed, change being made as regards the details described, provided the features stated in any of the following claims or the equivalent of such be employed.

We, therefore, particularly point out and distinctly claim as our invention:

1. The method of controlling plant growth which comprises applying to said plants a phytotoxic amount of a compound having the formula

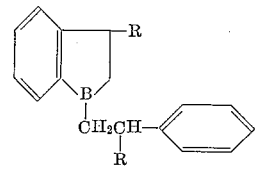

where R is selected from the group consisting of hydrogen and methyl.

2. The method of claim 1 in which said compound is applied at a rate of from about 3 pounds to about 60 pounds per acre.

3. The method of claim 1 where said compound is 1-bora-1-(2-phenylethyl)indane.

4. The method of claim 1 where said compound is 1-bora-3-methyl-1-(2-phenylpropyl)indane.

5. The method of selectively destroying dicotyledonous plants in areas containing both monocotyledonous plants and dicotyledonous plants which comprises applying to said plants, at the rate of from about 3 pounds to about 20 pounds per acre, a compound having the formula

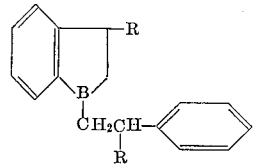

where R is selected from the group consisting of hydrogen and methyl.

6. The method of claim 5 where said compound is 1-bora-1-(2-phenylethyl)indane.

7. The method of claim 5 where said compound is 1-boro-3-methyl-1-(2-phenylpropyl)indane.

References Cited by the Examiner

UNITED STATES PATENTS

| 3,067,022 | 12/1962 | Nault | 71—2.3 |
| 3,088,817 | 5/1963 | Richter | 71—2.3 |
| 3,101,376 | 8/1963 | Brois et al. | 260—606.5 |
| 3,103,537 | 9/1963 | Ruthkowski | 260—606.5 |

FOREIGN PATENTS 1,089,384   9/1960   Germany.

LEWIS GOTTS, *Primary Examiner.*

JAMES O. THOMAS, JR., *Examiner.*

ALBERT J. ADAMCIK, *Assistant Examiner.*